United States Patent
Starr et al.

(10) Patent No.: US 8,234,005 B2
(45) Date of Patent: Jul. 31, 2012

(54) EFFICIENT MOVES THROUGH DRIVE REMAPPING

(75) Inventors: Matthew Thomas Starr, Lafayette, CO (US); Michael Gerard Goberis, Broomfield, CO (US)

(73) Assignee: Spectra Logic Corp., Boulder, CO (US)

( * ) Notice: Subject to any disclaimer, the term of this patent is extended or adjusted under 35 U.S.C. 154(b) by 470 days.

(21) Appl. No.: 12/553,737

(22) Filed: Sep. 3, 2009

(65) Prior Publication Data

US 2011/0051279 A1    Mar. 3, 2011

(51) Int. Cl.
- G06F 7/00 (2006.01)
- G06F 19/00 (2006.01)
- G11B 19/00 (2006.01)

(52) U.S. Cl. ........ 700/214; 700/215; 700/222; 700/245; 700/225

(58) Field of Classification Search .......................... None
See application file for complete search history.

(56) References Cited

U.S. PATENT DOCUMENTS

| | | | |
|---|---|---|---|
| 5,418,971 A * | 5/1995 | Carlson | 710/24 |
| 5,726,922 A * | 3/1998 | Womble et al. | 361/726 |
| 6,338,006 B1 * | 1/2002 | Jesionowski et al. | 700/214 |
| 7,313,718 B2 | 12/2007 | Kelman | |
| 7,457,846 B2 | 11/2008 | Baldwin et al. | |
| 7,567,886 B2 * | 7/2009 | Beeston et al. | 702/182 |
| 7,647,469 B2 * | 1/2010 | Gallo et al. | 711/200 |
| 7,788,413 B1 * | 8/2010 | Justiss et al. | 710/5 |
| 2002/0169521 A1 * | 11/2002 | Goodman et al. | 700/245 |

* cited by examiner

*Primary Examiner* — Gene Crawford
*Assistant Examiner* — Yolanda Jones
(74) *Attorney, Agent, or Firm* — Kenneth Altshuler

(57) ABSTRACT

A storage library is described including a first tape drive that is identified as a target tape drive to a host via a first address and a second tape drive that is masked from being identified by the host. The storage library further includes a controller that is linked with a switch system that shifts the first address to the second tape drive, from the first tape drive, such that after the shift, the second drive is identified as the target drive to the host and the first tape drive is masked from being identified by the host.

19 Claims, 10 Drawing Sheets

EFFICIENT MOVES THROUGH DRIVE REMAPPING

CROSS-REFERENCE TO RELATED APPLICATIONS

None.

BACKGROUND OF THE INVENTION

1. Field of the Invention

The present invention relates generally to shifting identity from one storage drive, such as a tape drive, to another storage drive without a host having any knowledge of the shift in identity.

2. Description of Related Art

Robotic storage library technology has been a staple in digital mass storage for back-up and server applications for many years. From the time of inception, the technology has evolved in increased complexity and capacity to meet the growing data storage needs fueled by a booming computer industry and the age of the internet. Increased speed at which data can be stored and retrieved for a host computer, or client, is ever evolving to meet the growing needs of those consuming data. Nonetheless, certain time-consuming operations, such as loading and unloading tape cartridges from tape drives, are constraints that exist in today's storage libraries.

In an effort to improve operational speed in handling load and unload operations within a storage library, methods are disclosed herein. It is to innovations related to this subject matter that the claimed invention is generally directed.

SUMMARY OF THE INVENTION

The present invention generally relates to a storage library that possesses at least one spare drive that is masked from a host and overcomes the disadvantages and limitations of the prior art by shifting identity from a first storage drive to the spare storage drive without the host having any knowledge of the shift in identity such that unload operations can be postponed to the first storage drive until after the shift has occurred.

One embodiment of the present invention can therefore comprise a method for moving data cartridges, the method comprising steps for: providing a first tape drive and a second tape drive, a first tape cartridge and a second tape cartridge, and a robotic transfer device; receiving an instruction from a client to load the first tape cartridge in a target tape drive to perform storage operations; moving the first tape cartridge from a shelf system to the first tape drive via the robotic transfer device wherein the first tape drive is designated the target tape drive; loading the first tape cartridge in the first tape drive in a first cooperating relationship; receiving an unload instruction from the client to unload and move the first tape cartridge from the target tape drive to the shelf system; responding to the client that the unload instruction is accomplished before actually carrying out the unload instruction; receiving a second instruction from the client to load the second tape cartridge in the target tape drive to perform second storage operations after the responding step; in response to the second instruction, moving the second tape cartridge from the shelf system to the second tape drive via the robotic transfer device; loading the second tape cartridge in the second tape drive to form a second cooperating relationship; unloading the first tape cartridge from the first tape drive after loading the second tape cartridge; and moving the first tape cartridge from the first tape drive to the shelf system after unloading the first tape cartridge.

DETAILED DESCRIPTION

Figure 1:
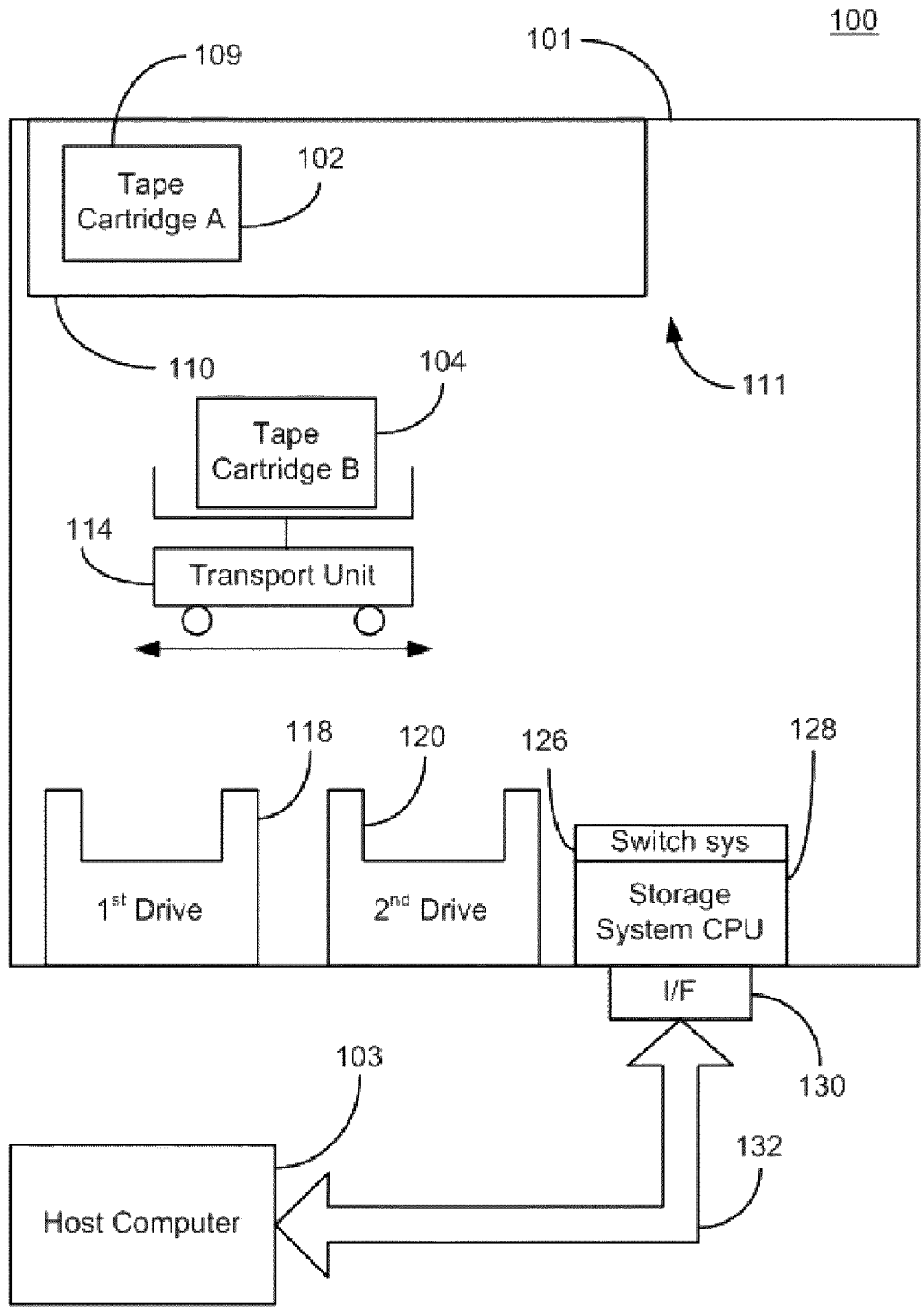
FIG. 1 is a diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structures may be identified using identical callouts.

The data storage arrangement 100 includes a host computer 103, or client, that is illustratively shown in communication (via the two-way arrow 132) with a storage system 101 via a primary communication interface processor device (I/F) 130 that includes a host port (not shown). The host computer 103 is one exemplary embodiment of a consumer of data, or client of data; other embodiments can also include a second storage system, similar to storage system 101, or a streaming output device such as a video server, just to name some examples. A consumer of data is an entity, or entities, that transmits data or receives data for storage elsewhere, i.e., a consumer of data is generally capable of "taking in" and/or "sending out" data. For example, a host computer 103 is a consumer of data when receiving data (or sending data, such as to the storage system 101), and a storage system 101 is a consumer of data when receiving data from and sending data to another entity wherein the data is stored. The host computer 103 can be a personal computer, a main frame computer, a server, or any computer system capable of communication with the storage system 101, just to name a few examples. The communication path 132 facilitates communication between the host computer 103 and the storage system 101. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path 132 can be in the form of a wire line pathway, wireless, or a combination thereof, for example.

The storage system 101, which in one embodiment is a tape library, is illustratively shown as generally including a shelf system 111, a robotic transport unit 114, a tape cartridge A 102 and a tape cartridge B 104, a first tape drive 118 and a second tape drive 120, a switch system 126, a storage system Central Processing Unit (CPU) 128 and I/F 130. As one skilled in the art will recognize, the block diagram of the storage system 101 shows the primary elements of interest for purposes of simplicity. As such, certain necessary structures and components for the aforementioned elements to properly function are omitted from the detailed description; however, such integrating structures and components do exist within the scope of the present invention. For example, in practice, the storage system 101 includes all of the necessary wiring, user interface panels, plugs, modular components, entry and exit port(s) to introduce (or remove) removable storage elements into the storage system 101, fault protectors, uninterruptable power supplies, processors, busses, robotic transport unit tracks, indication lights, and so on, in order to function as a data storage library.

As shown in the illustrative embodiment, the shelf system 111 possesses one shelf 110; however multiple shelves and multiple shelf levels can comprise the shelf system. The shelf system 111 is adapted to support the tape cartridges A 102 and B 104. The shelf system 111 can be located along one side of the storage system 101, as illustratively shown, or optionally in different locations, such as along opposing walls, for example. Furthermore, the shelf system 111 can provide more tailored accommodating locations adapted specifically to one or more tape cartridges or tape magazines, which are examples of storage elements. The tape cartridge is a storage element that has been adapted for repetitive mobility by a robotic transport unit storing data in a linear sequential fashion known to those skilled in the art.

In an optional embodiment, the tape cartridges can be substituted for a movable storage element which in embodiments can include a disc drive adapted for mobility, a disc drive magazine adapted for mobility, wherein the disc drive magazine comprises a plurality of disc drives, a solid state memory device adapted for mobility, such as a flash memory device, a tape magazine comprising a plurality of tape cartridges, an optical disc, a magazine comprising a plurality of optical discs, an independent storage disc, such as a magneto-optical disc or magnetic disc or alternative memory disc used as a storage medium, a magazine comprising a plurality of independent storage discs, or another type of storage device capable of storing data that is adapted for mobility. Further, the removable storage elements are removable from the storage system 101, for example, a tape cartridge, or other mobile storage element, is a removable storage element that can be stored in a location external to the storage system 101 in a vault. Hence, a removable storage element, also called a mobile storage element herein, is a storage element that is intended to be and capable of being moved and engaged with a drive cyclically and frequently. A standard disc drive alone, without modification, for example, is not intended to be frequently moved within or outside of a library (or computer system) and, hence, is not considered removable/mobile in the spirit of the inventive embodiments used herein unless adapted with a feature or features that facilitate mobility, such as high-cycle electrical contacts, for example. A drive herein is a device that is adapted to receive and substantially support a removable storage element via an opening in the drive such that when cooperatively linked a read and write relationship is formed (i.e., storage operations are facilitated between the drive and the removable storage medium). Storage operations include reading and writing data to and from the tape cartridge, as well as indexing across the tape or performing other operations when the tape cartridge is in a cooperating relationship with the drive. Some examples of a drive include, a disc drive docking station, a tape drive, disc drive magazine docking station. A socket adapted to receive a plug, such as a serial port and serial port connector, is not considered to be a docking station, rather, simply a socket.

With continued reference to FIG. 1, the storage system 101 possesses a robotic transport unit 114 illustratively shown transporting tape cartridge B 104 between a drive 118 and the shelf system 111. The term "robot" may be used, herein, to abbreviate the term "robotic transport unit" without departing from the scope and spirit of the present invention. In one embodiment, the robot is adapted to move between the shelf 110, or another shelf in the shelf system 111, and both of the tape drives 118, 120. Tape drive 118 may be used herein as a designation of a generic tape drive without specific reference, necessarily, to the first tape drive 118. Though the robot 114 is illustratively shown as a block diagram, one commercial example of a robotic transport unit can be seen in a T-950 library manufactured by Spectra Logic Corp., of Boulder, Colo. The T-950 robotic transport units traverse the T-950 library along a track system and move vertically via an elevator system integrated with each robot transport unit. Furthermore, the T-950 robotic transport units possess an integrated picker system that grasps removable storage elements from a shelf system or from a drive to be moved via the associated robotic transport unit. The integrated picker system further is capable of disposing a removable storage element to the shelf system or to a drive. In the present illustrative embodiment, the robot merely provides transportation of the tape cartridges A 102 and B 104 from a location associated with the shelf system 111 to a drive 118 wherein the robot 114 may provide the added feature of depositing a tape cartridge to the shelf system 111 and/or loading a tape cartridge in a cooperating relationship with a tape 118 drive such that data can be read to and written from the tape cartridge via the tape drive 118. In optional configurations, a loading feature can reside with each tape drive1 8 as opposed to a picker unit integrated with a robotic transport unit 114.

The storage system 101 illustratively shows two tape drives 118 and 120, however, in optional embodiments, the storage system 101 may possess more or fewer tape drives 118. Though the illustrative embodiments described herein are directed to tape drives and tape systems, those skilled in the art will recognize that aspects of the present invention are transferrable to other storage systems without departing from the scope and spirit of the present invention. For example, a drive herein is considered to be a device that forms a cooperating relationship with a removable storage element such that data can be written to and from the removable storage element wherein the removable storage element serves as a mass storage device. A drive herein is not merely a socket device and cable, such as that which is used for connecting a disk drive to a computer system. Examples of various drives used within the scope and spirit of this invention include: a tape drive that is adapted to receive tape cartridges, a disk drive docking station which receives a disk drive adapted for mobility that when paired forms a cooperating read and write relationship, such as a disk drive inside an exterior casing with electrical contacts designed for high cycle contacting, and a disk drive magazine docking station which receives a removable disk drive magazine.

FIG. 1 further illustratively shows communication protocol bridged between the host computer 103 and the tape library 101 via the I/F 130. That is, the host computer 103 may communicate over one protocol and the tape library 101 may use a different protocol, hence, the I/F 103 facilitates communication to occur between the tape library 101 and the host computer 103. One commercial example of an I/F system is a Fibre Quad Interface Processor (FQIP) manufactured by Spectra Logic Corporation. The FQIP facilitates communication between a host computer system which uses a fibre protocol and the Spectra Logic storage library which uses a SCSI-like Computer Area Network (CAN) protocol unique to the Spectra Logic Corporation to communicate with the components comprised therein over the library's internal Computer Area Network bus. The I/F 130 is linked to the CPU 128, along with most electrical components within the tape library 101 via a CAN (not shown) specific to the tape library 101. The I/F 130 is illustratively shown in communication via the two-way arrow 132 with the host computer 103. Generally, the host computer 103 issues a read element status request used to determine the identity and volume of tape cartridges, the number of tape drives and their respective logical unit numbers, the number of robots (in this example there is one robot shown, however multiple robots can be used without departing from the scope and spirit of the present invention), tape cartridges going in and out of the library 101. More specifically, the library 101 maintains element addresses which include storage element addresses, data transfer element addresses, import/export element addresses, and media transport element addresses.

Figure 2:
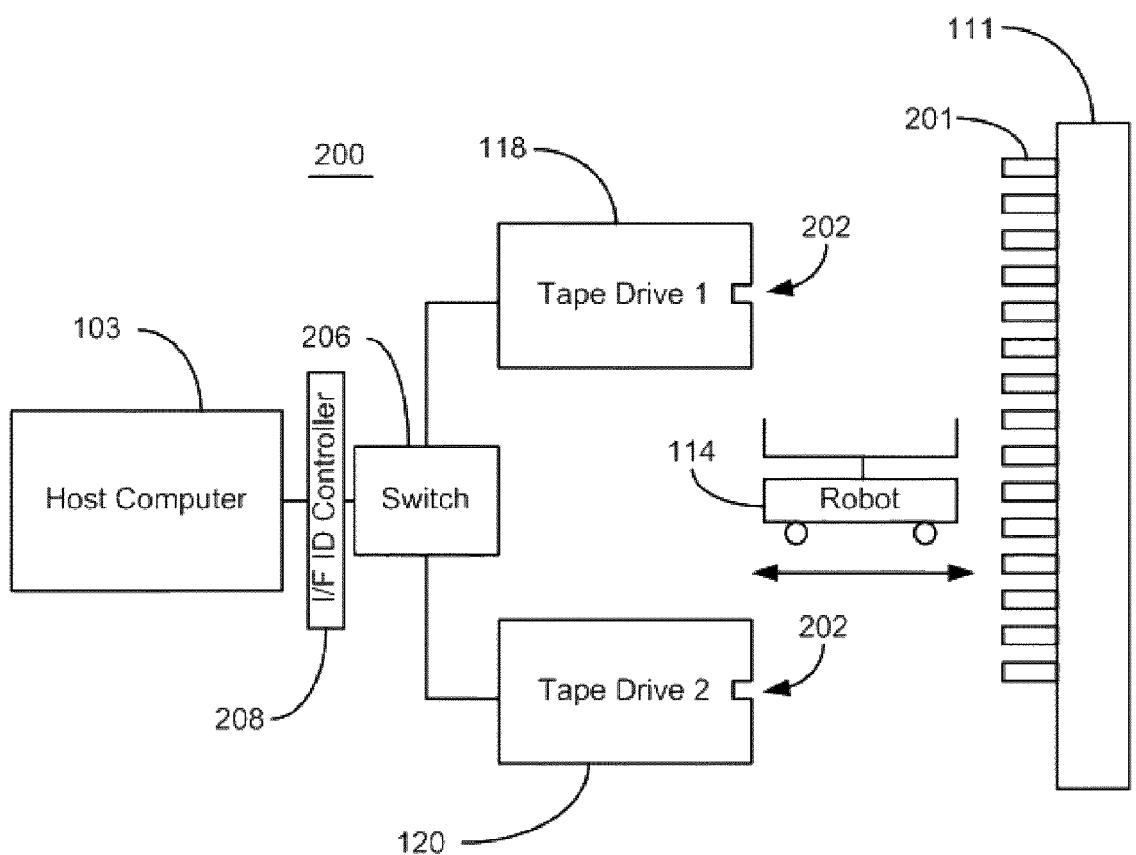
FIG. 2 is a diagram of a data storage arrangement 200 constructed in accordance with an embodiment of the present invention.

FIG. 2 is a block drawing of specific elements from FIG. 1 used herein to illustrate an embodiment of the present invention. As shown, the arrangement 200 has a first tape drive 118 and a second tape drive 120 that are connected to a switch system 206. The first tape drive 118 and second tape drive 120 each possess an opening 202 to receive a tape cartridge 201 to form a cooperating relationship; that is, a relationship wherein a tape cartridge 201 is loaded in a tape drive to typically perform read and write operations. A host computer 103 is linked to the first tape drive 118 and the second tape drive 120 via the switch system 206 and interface ID and controller 208. A commercial example of a switch system 206 is a Brocade fibre switch constructed by Brocade Communications Systems, Inc., of San Jose, Calif., and interface/controller 208 a Fibre Quad Interface Processor (FQIP) manufactured by Spectra Logic Corporation. In one embodiment, the host computer 103 identifies a tape drive (or other element within a storage system) via an element address and World Wide Name (WWN). Here, the switch system 206 can maintain both an element address, such as a serial number of a specific tape drive, and WWN associated with the specific tape drive or location where the specific tape drive resides, such as a drive bay. In another embodiment, the interface and controller 208 can maintain an element address and WWN, or other indicia to make known a tape drive "A" host computer 103. One skilled in the art will recognize that there are a variety of ways to identify a tape drive to the host computer 103 including processors, Computer Area Network arrangements, combination switch and processors, just to name a few examples. In this embodiment, the interface identification and controller device 208 makes known to the host computer 103 that there is one tape drive at a specific address, however, in reality, there is the first tape drive 118 and the second tape drive 120. In one optional embodiment, the first tape drive 118 and the second tape drive 120 share the same address viewable to the host computer 103 but the switch system 206 toggles connectivity between either the first tape drive 118 or the second tape drive 120. The robot transfer unit 114 moves a tape cartridge 201 between the shelf system 111 and the first tape drive 118 and the second tape drive 120.

Figure 3A:
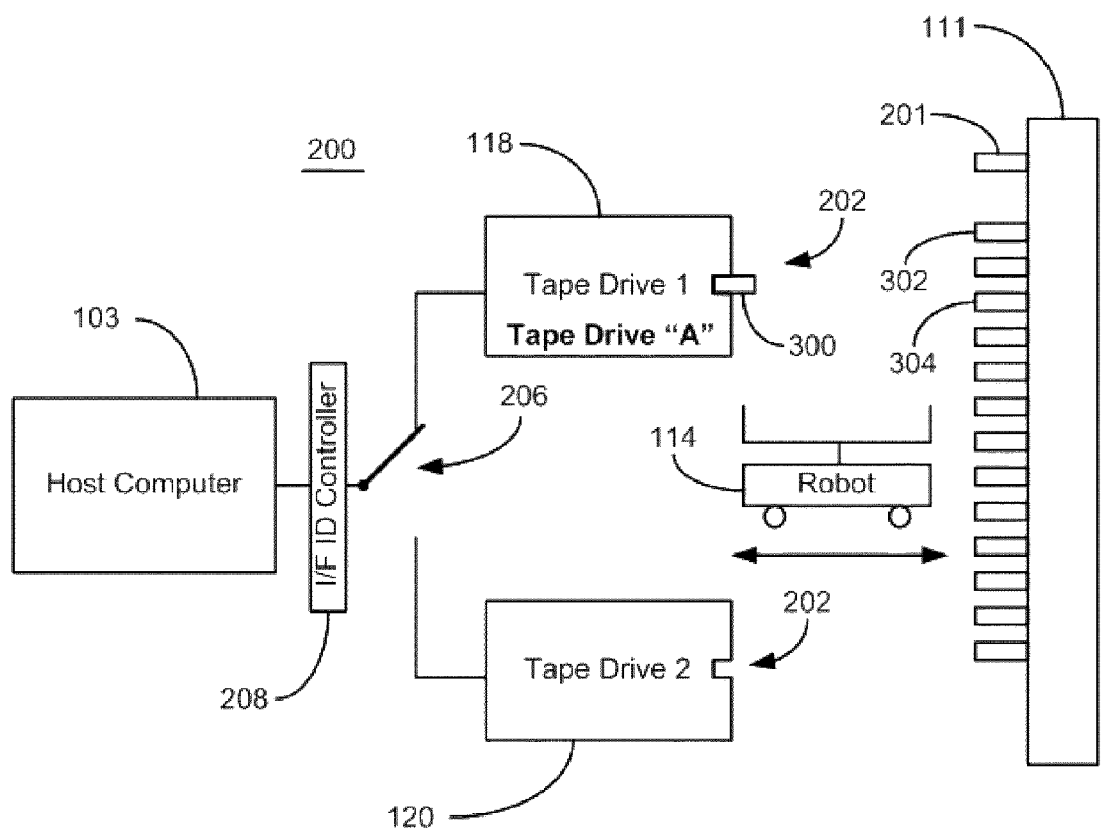
FIGS. 3A-3C are diagrams of certain specific elements from FIG. 1 used to illustrate a sequence of events consistent with an embodiment of the present invention.

FIG. 3A shows the illustrative embodiment described in FIG. 2, however, a first tape cartridge 300 is loaded in the first tape drive 118. In this embodiment, the host computer 103 is linked to the first tape drive 118 via the switch system 206 which the host computer 103 identifies as tape drive "A" (or the target tape drive). A first tape cartridge 300 is loaded in the first tape drive 118 wherein storage operations can take place. Therefore, the host computer 103 is engaged in data operations with the first tape cartridge via tape drive "A", which in this case is the first tape drive 118. The host computer 103 can merely have instructed the first tape cartridge 300 to be loaded in tape drive "A" pending further instructions. The host computer 103 has no knowledge of the second tape drive 120 because the switch system 206, which is illustratively shown as a toggle switch, is linking the host computer 103 to the first tape drive 118.

Figure 3B:
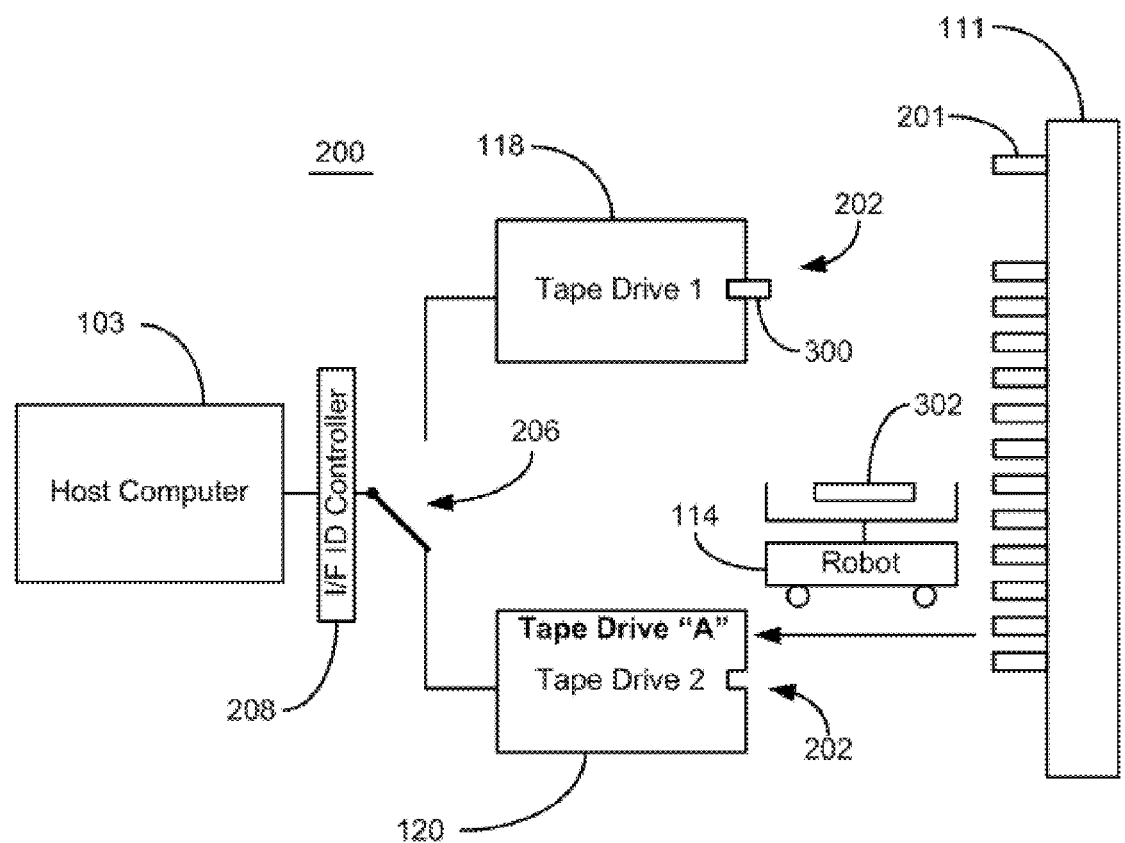

FIG. 3B shows the illustrative embodiment described in FIG. 3A, however, the switch system 206 is toggled to link the host computer 103 with the second tape drive 120, which the host computer 103 identifies as tape drive "A". In one example, the host computer 103 may have a need to engage a second tape cartridge 302 with tape drive "A" following its engagement with the first tape cartridge 300. In this example, the host computer 103 issues a first instruction to unload and move the first tape cartridge 300 to the shelf system 111 prior to issuing any instruction to move and load the second tape cartridge 302 to tape drive "A". In some configurations, the host computer 103 further issues a "rewind" instruction prior to unloading a tape cartridge 201. In other configurations, a tape cartridge 201 will automatically rewind the tape medium, disposed in the tape cartridge 201, prior to ejecting a tape cartridge 201 from a tape drive. In any event, the rewind operation takes time, the unload operation takes time, and the act of moving the first tape cartridge 300 to the shelf system 111 via the robot unit 114 takes time. Instead of carrying out the first instruction, the first instruction is queued by the I/F ID controller 208, the switch system 206 links the second tape drive 120 with the host computer 103, which now becomes tape drive "A", and the I/F ID controller 208 responds to the host computer 103 that the first instruction has been completed. The steps do not necessarily conform to this order and other means for switching and responding to the host computer 103 are contemplated within the spirit and scope of the present invention. This is all done prior to actually completing the first instruction. Believing that the first instruction has been completed, the host computer 103 will issue a second instruction to move the second tape cartridge 302 to tape drive "A" and load the second tape cartridge 302 in tape drive "A". The robotic transport unit 114, is then free to carry out the second instruction, as shown by the robotic transport unit 114 carrying the second tape cartridge 302 to the second tape drive 120.

Figure 3C:
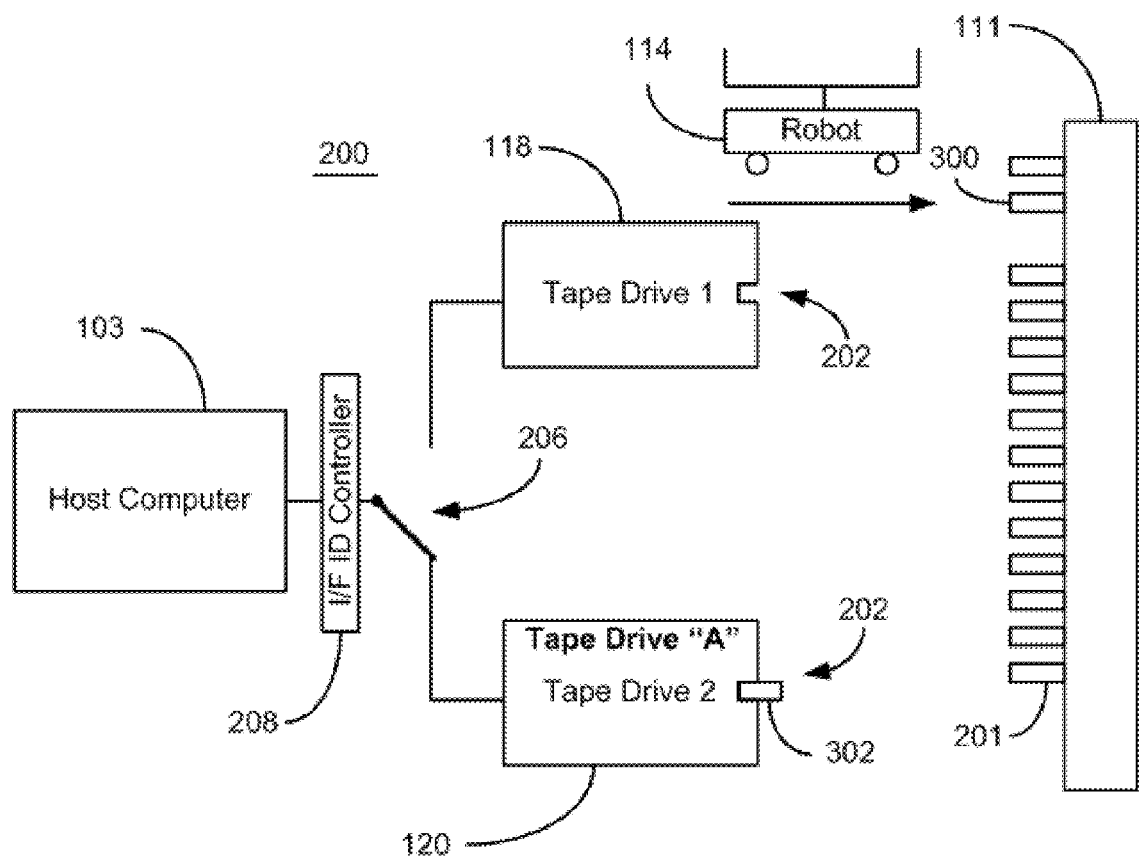

FIG. 3C shows the second tape loaded in the second tape drive 120, wherein storage operations with the host computer 103 can take place. The queued first instruction is then carried out and the first tape cartridge 300 is disposed in the shelf system 111. This postponed act of carrying out the first instruction need not be known by the host computer 103. In an optional embodiment, the first tape drive 118 and the second tape drive 120 are disposed in two separate libraries that may have some common link.

Figure 4:
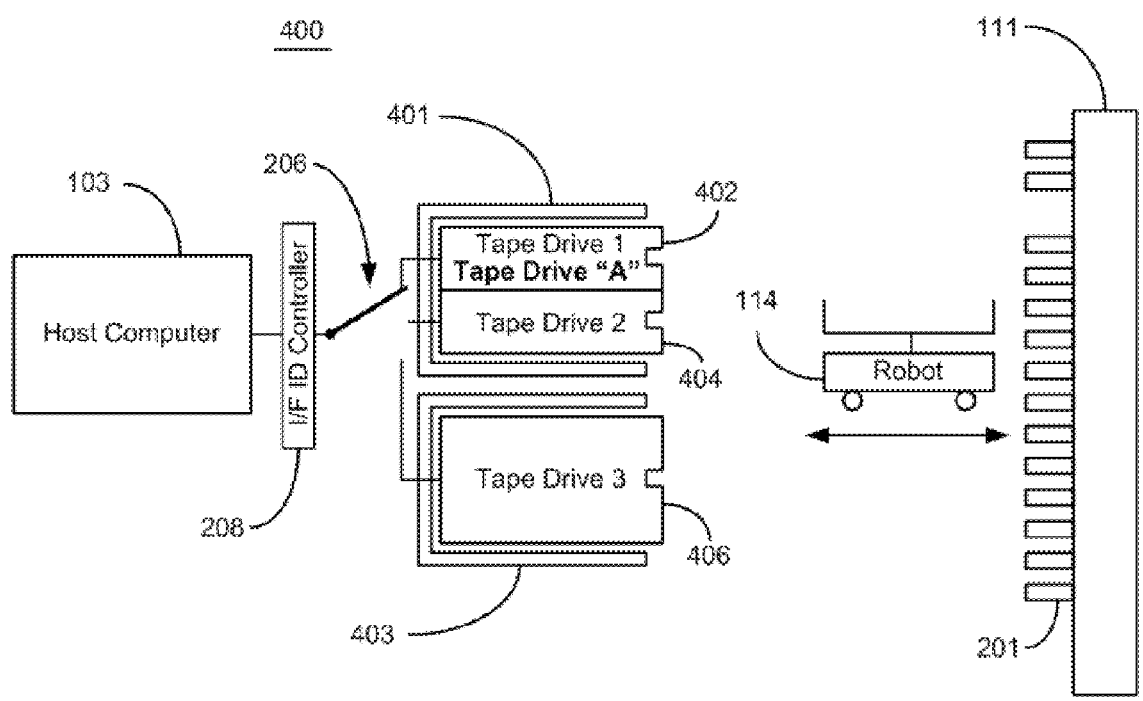
FIG. 4 is a diagram illustrating half-height drives consistent with embodiments of the present invention.

FIG. 4 is a block drawing of specific elements from FIG. 1 similar to the description of FIG. 2 used herein to illustrate an embodiment of the present invention. As shown, the arrangement 400 has a first tape drive 402 and a second tape drive 404 that are both half-height tape drives disposed in a first drive sled 401. A half-height tape drive has a geometry that is half the height of a standard tape drive to take advantage of space constraints. An example of a half-height tape drive is a half-height LTO built by IBM, Corp. A drive sled, such as 401 and 403, is a frame that partially encases a tape drive to provide not only mechanical support but also electrical/communication connectivity to a library, such as the library 101. Arrangement 400 further comprises a third tape drive 406 that is a full-sized tape drive disposed in a second drive sled 403. As discussed in conjunction with FIGS. 3A-3C, the switch system 206 can toggle between the first tape drive 402, the second tape drive 404, and the third tape drive 406. The tape drive that is linked to the host computer 103 is identified by the host computer 103 as tape drive "A". The switch system 206 can be a hardware device, a controller device or a processor that maintains programming to alter identification, or mapping, of tape drive "A" between the different tape drives 402, 404 and 406. In another embodiment, the switch system 206 only toggles between the first tape drive 402 and the second tape drive 404 to designate the identity of tape drive "A", and the third tape drive 406 is always identified by the host computer 103. Optionally, any of the two tape drives can be toggled to designate the identity of tape drive "A" while the remaining tape drive is not involved in the aforementioned masking scheme to the host computer 103. In an optional embodiment, there are four drives; two of which that can be switched between tape drive "A" and two of which that can be switched between a tape drive "B".

Figure 5:
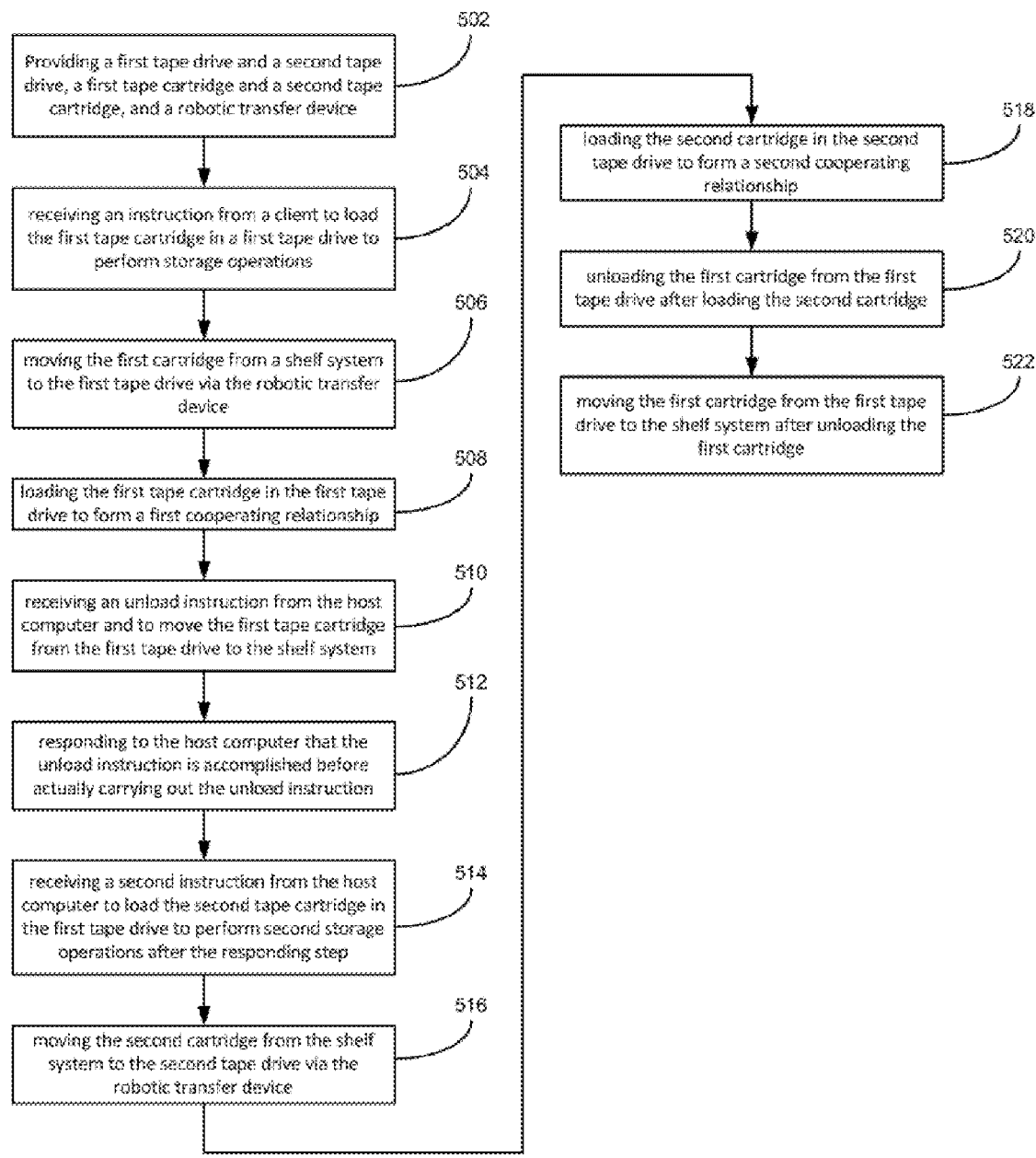
FIG. 5 is a block diagram illustrating a method to practice an embodiment of the present invention.

Referring now to FIG. 5, shown therein is a block diagram illustrating method steps to practice an embodiment of the present invention. It should be recognized that the steps presented in the described embodiments of the present invention do not necessarily require any particular sequence unless otherwise specified explicitly or by alphabetizing or numbering steps. FIGS. 1, 3A-3C, and 4 are used in conjunction with FIG. 5 for purposes of illustration in the present described embodiment. The steps describe an embodiment, consistent with the present invention, of a method for moving data cartridges through re-ordering load and unload instructions in conjunction with re-directing storage traffic to alternate tape drives in a storage library 101 as shown in FIGS. 3A-3C. Step 502 is a step for providing a first tape drive 118 and a second tape drive 120, a first tape cartridge 300 and a second tape cartridge 302, and a robotic transfer device 114, which are some of the basic components generally found in a storage system, such as the storage system of FIG. 1. Step 504 is a step for receiving an instruction from a host computer 103 to load the first tape cartridge 300 in a target tape drive to perform storage operations. Step 506 is a step for moving the first cartridge 300 from a shelf system 111 to the first tape drive 118 via the robotic transfer device 114, wherein the first tape drive 118 is seen by the host computer 103 as the target tape drive. Step 508 is a step for loading the first cartridge 300 in the first tape drive 118 to form a first cooperating relationship. This can be accomplished with the robotic transfer device 114 such as with an integrated picker, or optionally, an independent picking mechanism that inserts the first cartridge 300 into an accommodating opening in the first tape drive 118. Step 510 is a step for receiving an unload instruction from the host computer 103 and to move the first tape cartridge 300 from the target tape drive, which is presently the first tape drive 118, to the shelf system 111. Step 512 is a step for responding to the host computer 103 that the unload instruction is accomplished before actually carrying out the unload instruction. Instead, the unload instruction is held in memory for future execution. This can be accomplished via a switch system 206 wherein the host computer 103 is directed to identifying the second tape drive 120 as the target tape drive. Step 514 is a step for receiving a second instruction from the host computer 103 to load the second tape cartridge 302 in the target tape drive to perform second storage operations after the responding step 512. The host computer 103 believing that the unload instruction has been carried out with the target tape drive assumes that the target tape drive is available to receive a new tape cartridge, such as the second cartridge 302. Step 516 is a step for moving the second cartridge 302 from the shelf system 111 to the second tape drive 120 via the robotic transfer device 114. Step 518 is a step for loading the second cartridge 302 in the second tape drive 120 to form a second cooperating relationship. Step 520 is a step for unloading the first cartridge 300 from the first tape drive 118 after loading the second cartridge 302. In this sequence of events, time is saved because unloading the first cartridge 300 can be done while storage operations are occurring with the second cartridge 302. Step 522 is a step for moving the first cartridge 300 from the first tape drive 118 to the shelf system 111 after the unloading the first cartridge 300.

Figure 6:
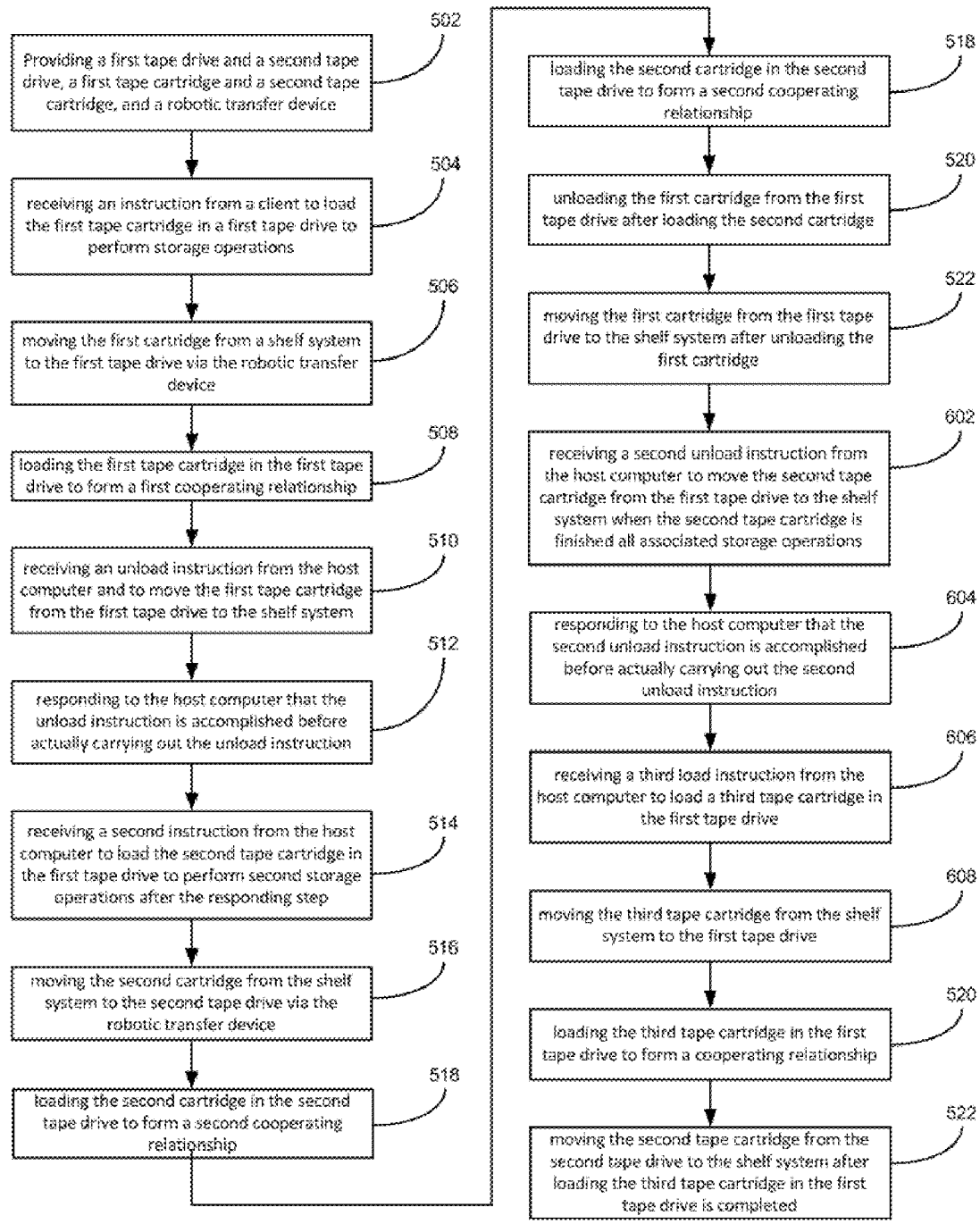
FIG. 6 is a block diagram illustrating yet another method to practice an embodiment of the present invention.

FIG. 6 shows an optional embodiment of loading a third tape cartridge before the second tape cartridge 302 is unloaded. FIG. 6 features common steps with FIG. 5 with the addition of steps 602-612. Step 602 features a step for receiving a second unload instruction from the host computer 103 to move the second tape cartridge 302 from the target tape drive to the shelf system 111 when the second tape cartridge 302 is finished all associated storage operations. The switch system 206 can switch identity of the target tape drive back to the first tape drive 118 at this point. Step 604 is a step for responding to the host computer 103 that the second unload instruction is accomplished before actually carrying out the second unload instruction. The second unload instruction is queued for execution after step 610. Step 606 is a step for receiving a third load instruction from the host computer 103 to load a third tape cartridge 304 in the target tape drive. The host computer 103 believing now that the second unload instruction has been completed and the target tape drive is empty and available to receive a new tape cartridge 201. Step 608 is a step for moving the third tape cartridge 304 from the shelf system 111 to the first tape drive 118. Step 610 is a step for loading the third tape cartridge 304 in the first tape drive 118 to form a cooperating relationship. Step 612 is a step for moving the second tape cartridge 302 from the second tape drive 120 to the shelf system 111 after loading the third tape cartridge 304 in the first tape drive 118 is completed. In yet another optional embodiment, the unload instruction further accompanies a rewind instruction wherein the target tape drive is instructed to rewind the tape medium contained in a tape cartridge, such as the first cartridge 300, before the tape cartridge is ejected from the target tape drive.

Figure 7A:
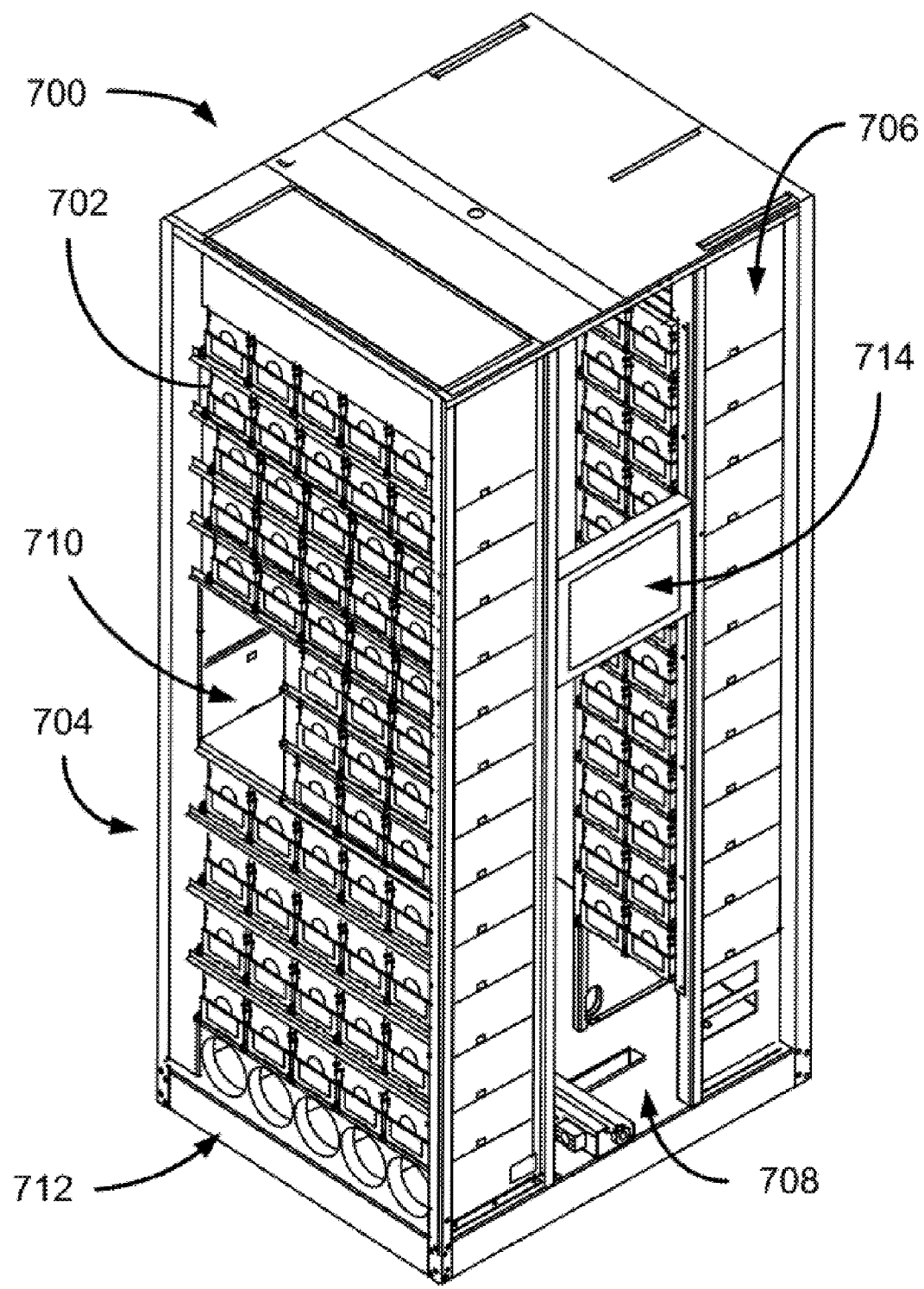
FIGS. 7A and 7B illustrate different perspective views of a Spectra Logic e-950 storage library without a cover in which some embodiments of the present invention can be commercially practiced.
Figure 7B:
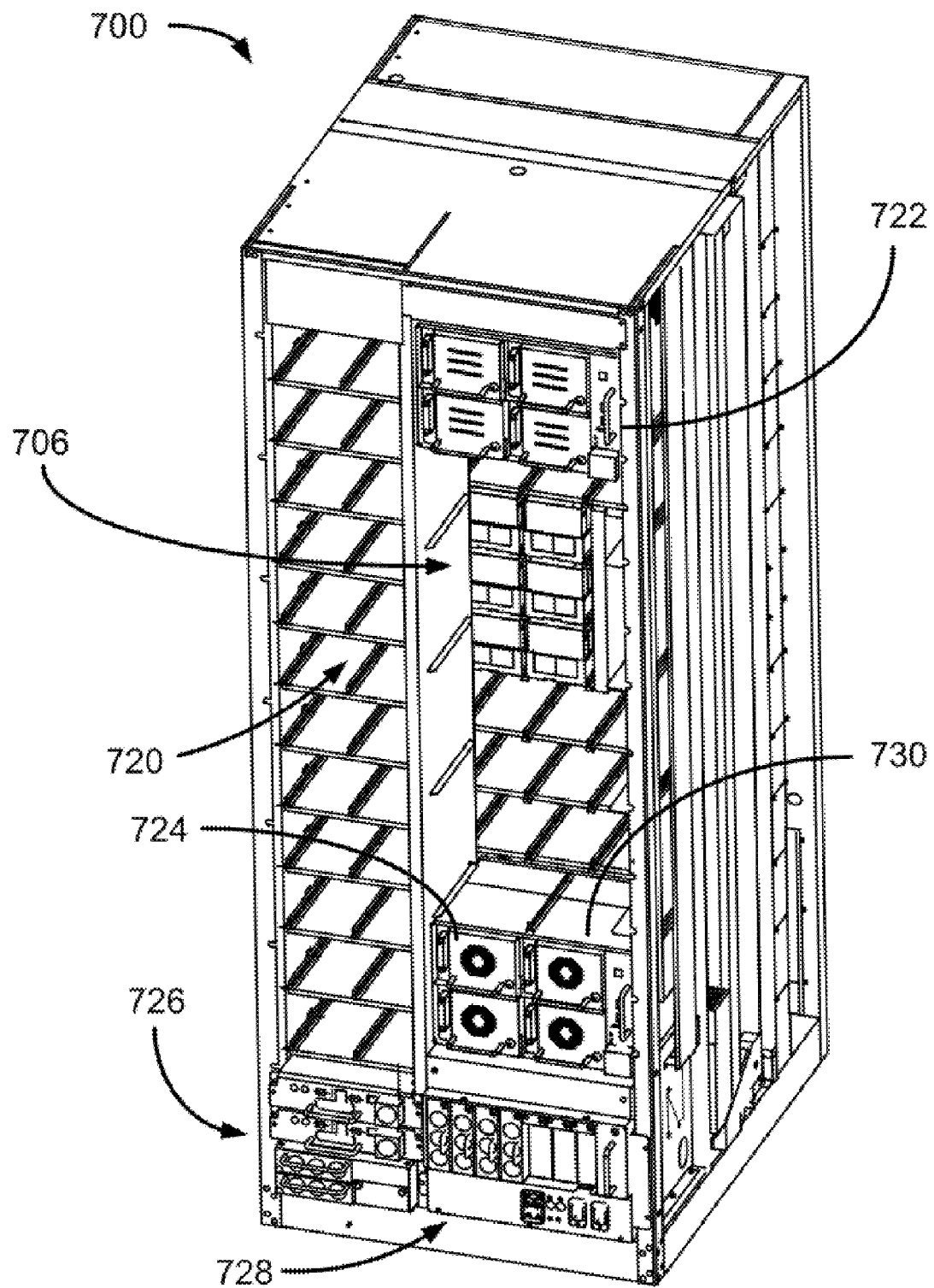

Embodiments of the present invention can be practiced in conjunction with an e-950 series data storage library 700 produced by Spectra Logic Corporation as shown in FIGS. 7A and 7B. The e-950 series library 700 is capable of comprising both disc drive magazines and tape cartridges. FIG. 7A shows a front view of the library 700 populated with tape cartridges which are disposed in tape cartridge magazines 702. A tape cartridge and a disc drive magazine are both embodiments of a removable storage element. In one embodiment, the e-950 library 700 comprises a shelf system 704 that is adapted to support the tape cartridge magazines 702 and the disc drive magazines (not shown) which are archived in the library 700. In one configuration, the footprint of a tape cartridge magazine 702 and a disc drive magazine are substantially identical for compatibility when archiving in the shelf system 704 or for moving the magazines 702 within the library 700 via a common robotic system. The e-950 library 700 further comprises a user definable space 706 capable of comprising additional shelf space 704 for storage elements 702 and/or space dedicated for drives, such as an LTO-3 tape drive(s) and/or disc drive magazine docking station(s) (not shown) adapted to receive disc drive magazines to form a connection link with the library 700. Functionally interposed between the user definable space 706 and the shelf system 704 is a magazine transport space 708. The magazine transport space 708 is adapted to provide adequate space for a magazine 702 to be moved from a position in the shelf system 704, for example, to a drive, such as an LTO-3 tape drive. Magazines 702 can be transferred into and out from the e-950 library 700 via an entry/exit port 710. Transferring magazines 704 in an out of the e-950 library 700 can be accomplished by an operator, for example. The e-950 library 700 comprises a means for cooling as shown by the fans 712 located at the base of the library 700. The e-950 library 700 further comprises a Graphical User Interface, GUI, which is implemented with a touch screen 714.

With reference to FIG. 7B, shown therein is the e-950 library 700 without an enclosure, rotated 180° relative to FIG. 7A exposing the user definable space 706. The user definable space 706 shows a column of additional shelves 720 for archiving magazines 702, a block of four disc drive magazine docking stations 722, a block of four LTO-3 tape drives 724, and additional vacant user definable space 706. The e-950 library 700 also comprises a Library Control Module, LCM, 726, the Spectra Logic's FQIP 726, and a power supply 728 capable of converting AC current to DC current for consumption by the library 700.

The e-950 library 700 is capable of bridging communication between at least two different communications protocols on either side of the FQIP 726. The FQIP 726 functions as a combination bridge controller device enabling communication between the e-950 library 700 and a client, or host, in a fibre channel protocol, for example, and communication from the FQIP 726 to a drive 724 via the Computer Area network in a SCSI channel protocol. Furthermore, the FQIP 726 is adapted to direct data step for storage on a specific drive possessing a storage element address, SN and WWN. Directing data traffic via the FQIP is necessary for mapping out any global spare drives or facilitating library partitions. The e-950 library 700 is capable of being divided into partitions such that a first client, or host, may be allocated a first partition, or fraction, of the library's 700 storage capacity and resources (for example 60 percent of the storage space within the library 700) and a second client, or host, is allocated the remainder of the library's 700 storage capacity and resources (for example 40 percent of the storage space within the library 700) in a second partition. It should be recognized that the number of partitions can exceed two. One embodiment of the present invention contemplates a first tape drive 724 and a second tape drive 730, which in this embodiment is a "spare drive" that can act as a spare to another drive, as dependent to a specific partition. Another embodiment contemplates a spare drive 730 that is independent of a partition but becomes part of a partition when paired with an active drive such as tape drive 724. The spare drive becomes paired with an active drive tape drive to be able to switch identities with the active tape drive 724, and therefore, assuming the SCSI Element Address of the active tape drive 724 to assume additional instructions from a host while instructions related to unloading the first tape drive 724 are queued for a more convenient time to execute the instructions related to unloading the first tape drive 724 (consistent with embodiments described in conjunction with FIG. 5). Once the identity of the second tape drive 730 is switched to the first tape drive 724, the second tape drive 730 is free to become paired with another tape drive to switch identities to queue unload commands. In an optional embodiment the first tape drive 724 and the second tape drive 730 remain a pair that does not extend to any other tape drives.

With continued reference to e-950 library 700 in relation to the spare drive 730, the LCM 726 functions to, among other things, provide a local interface, such as the GUI touch screen 714, or a remote interface, such as a Personal Computer, PC, (not shown) accessible through a web browser, for example. The library 700 further possesses a plurality of drive bays that each accommodates a drive sled, generally comprised by the components shown in the tape drives 724. A drive sled is a structure that contains a tape drive 724 and provides connectivity between the tape drive 724 and the drive bay. The drive sled contains a Drive Control Module, DCM, which is linked to the LCM 726 via the CAN. When the identity of a drive 724 is switched to a spare drive 730 the DCM 726 is reconfigured, i.e., instructed, to assume the SN and WWN information of the switched drive 724 and the LCM 726 remaps the spare location (generally 730) to assume the same element address as the drive 724 that was taken out of an active state with the host. The new map, or library configuration, is stored in a flash element comprised by the LCM 726. Hence, the spare tape drive 730 assumes the identity of the original tape drive 724 without the client, or host, having any knowledge of the identity switch. In this way, the identity of the original tape drive 724 is shifted to the spare tape drive 730. The spare 730 is taken "on-line" such that the client, or host, has no knowledge that a shift in identity has occurred, thus, saving time to execute steps associated with an unloading process.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple drives can be used as a spare drive, for example, while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 101, communication can be received directly by a drive, such as the first drive 118, via the interface device 130, for example, without departing from the scope and spirit of the present invention. Further, for purposes of illustration, a first and second tape drives and tape cartridges are used herein to simplify the description for a plurality of drives and tape cartridges. Finally, although the preferred embodiments described herein are directed to tape systems, such as the tape cartridges and tape storage systems, such as a tape library, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method comprising the steps for:
receiving an unload instruction from a client to move a first tape cartridge from a first tape drive to a shelf system;

responding to said client that said unload instruction is accomplished before actually carrying out said unload instruction;
receiving a load instruction from said client to load a second tape cartridge in said first tape drive;
in response to said load instruction, moving said second tape cartridge from said shelf system to a second tape drive via a robotic transfer device;
loading said second tape cartridge in said second tape drive to form a cooperating relationship;
moving said first tape cartridge from said first tape drive to said shelf system after loading said second tape cartridge;
receiving a second unload instruction from said client to move said second tape cartridge from said first tape drive to said shelf system;
responding to said client that said second unload instruction is accomplished before actually carrying out said second unload instruction;
receiving a third load instruction from said client to load a third tape cartridge in said first tape drive;
moving said third tape cartridge from said shelf system to said first tape drive;
loading said third tape cartridge in said first tape drive to form a cooperating relationship; and
moving said second tape cartridge from said second tape drive to said shelf system after loading said third tape cartridge in said first tape drive.

2. The method of claim 1 further comprising indicating to said client that said second tape drive is said first tape drive.

3. The method of claim 1 wherein said first tape drive and the second tape drive are in a common drive sled.

4. The method of claim 3 wherein said first tape drive and second tape drive are half-height tape drives.

5. The method of claim 1 wherein said first tape drive and said second tape drive are in different libraries.

6. The method of claim 1 further comprising postponing a rewind instruction to rewind said first tape cartridge until after loading said second tape cartridge, said rewind instruction is associated with said unload instruction.

7. The method of claim 1 further comprising:
performing an operation associated with said second tape drive after said responding step and prior to said receiving step.

8. The method of claim 7 wherein said operation is cleaning said second tape drive.

9. The method of claim 7 wherein said operation is replacing said second tape drive with a different tape drive.

10. A method comprising the steps for:
responding to a client that a first instruction to move a first tape cartridge from a first tape drive to a shelf system is accomplished but instead said first instruction is queued;
carrying out said first instruction after carrying out a second instruction to load a second tape cartridge in a second tape drive wherein said second tape drive appears to said client as being said first tape drive;
receiving a third instruction from said client to move said second tape cartridge from said first tape drive to said shelf system;
responding to said client that said third instruction is accomplished before actually carrying out said third instruction;
receiving a fourth instruction from said client to load a third tape cartridge in said first tape drive;
moving said third tape cartridge from shelf system to said first tape drive;
loading said third tape cartridge in said first tape drive to form a cooperating relationship; and
moving said second tape cartridge from said second tape drive to said shelf system after loading said third tape cartridge in said first tape drive.

11. The method of claim 10 wherein both said first tape drive and said second tape drive are identified by said client as only said first tape drive.

12. The method of claim 11 wherein said first tape drive and said second tape drive share a common external address.

13. A method for moving data cartridges, the method comprising steps for:
providing a first tape drive and a second tape drive, a first tape cartridge and a second tape cartridge, and a robotic transfer device;
receiving an instruction from a client to load said first tape cartridge in a target tape drive to perform storage operations;
moving said first tape cartridge from a shelf system to said first tape drive via said robotic transfer device wherein said first tape drive is designated said target tape drive;
loading said first tape cartridge in said first tape drive in a first cooperating relationship;
receiving an unload instruction from said client to unload and move said first tape cartridge from said target tape drive to said shelf system;
responding to said client that said unload instruction is accomplished before actually carrying out said unload instruction;
receiving a second instruction from said client to load said second tape cartridge in said target tape drive to perform second storage operations after said responding step;
in response to said second instruction, moving said second tape cartridge from said shelf system to said second tape drive via said robotic transfer device;
loading said second tape cartridge in said second tape drive to form a second cooperating relationship;
unloading said first tape cartridge from said first tape drive after loading said second tape cartridge; and
moving said first tape cartridge from said first tape drive to said shelf system after unloading said first tape cartridge.

14. The method of claim 13 further comprising the step for performing storage operations on said first tape cartridge when in said first cooperating relationship.

15. The method of claim 13 is performed in a data storage library.

16. The method of claim 13 further comprising:
receiving a second unload instruction from said client to unload and move said second tape cartridge from said target tape drive to said shelf system;
responding to said client that said second unload instruction is accomplished before actually carrying out said second unload instruction;
receiving a third instruction from said client to load a third tape cartridge in said target tape drive;
moving said third tape cartridge from said shelf system to said first tape drive via said robotic transfer device;
loading said third tape cartridge in said first tape drive to form a cooperating relationship;
unloading said second tape cartridge from said second tape drive after loading said third tape cartridge; and
moving said second tape cartridge from said second tape drive to said shelf system after said unloading said second tape cartridge.

17. The method of claim 13 wherein said first tape drive and the second tape drive are in a common drive sled.

18. The method of claim 17 wherein said first tape drive and second tape drive are half-height tape drives.

19. The method of claim 13 further comprising the step for receiving a first rewinding instruction from said client to rewind said first tape cartridge prior to initiating said unload instruction; postponing said first rewind instruction until after loading said second tape cartridge in said second tape drive.

* * * * *